June 7, 1960

R. G. SCHMITT 2,939,379

APPARATUS FOR POPPING POPCORN

Filed Feb. 25, 1959

INVENTOR.
Roland G. Schmitt
BY
Leonard S. Knox

June 7, 1960 R. G. SCHMITT 2,939,379
APPARATUS FOR POPPING POPCORN
Filed Feb. 25, 1959 3 Sheets-Sheet 2

INVENTOR.
Roland G. Schmitt
BY
Leonard Knox

June 7, 1960 R. G. SCHMITT 2,939,379
APPARATUS FOR POPPING POPCORN
Filed Feb. 25, 1959 3 Sheets-Sheet 3
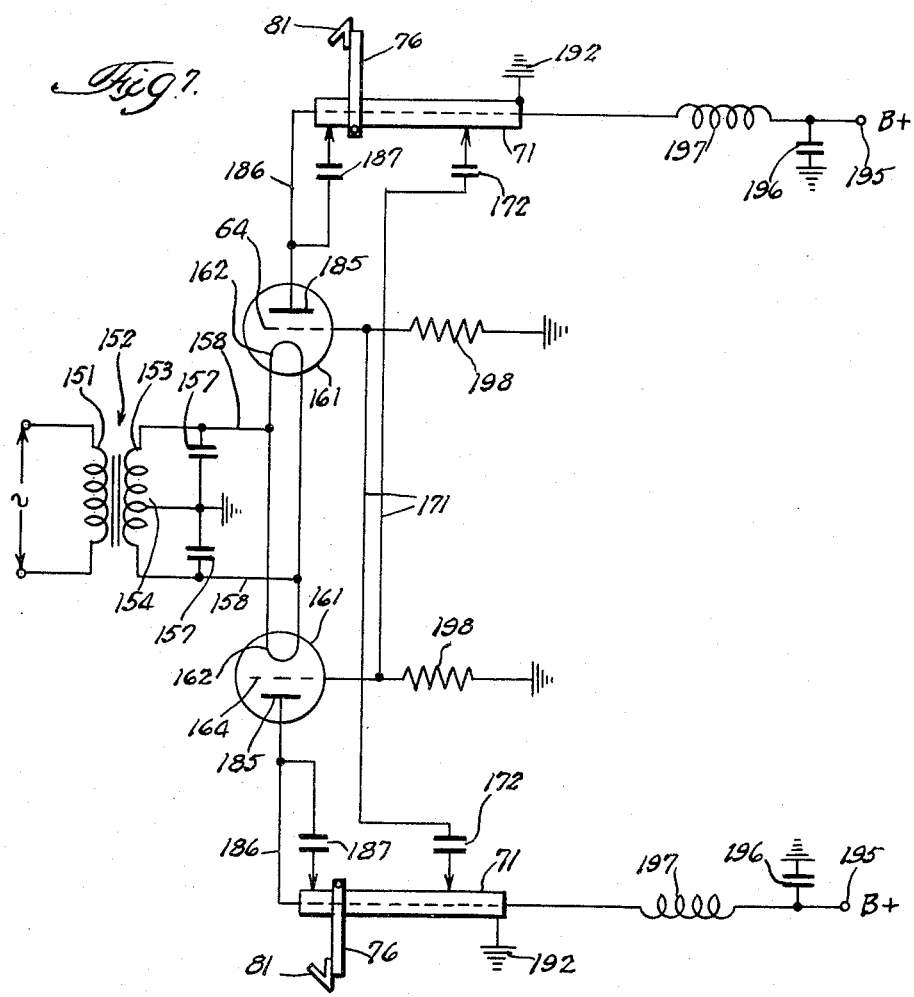
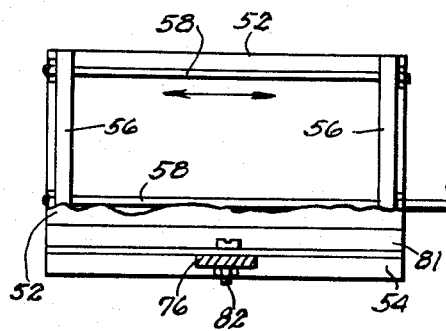
INVENTOR.
Roland G. Schmitt
BY
Leonard S. Knox
Atty.

United States Patent Office 2,939,379
Patented June 7, 1960

2,939,379

APPARATUS FOR POPPING POPCORN

Roland G. Schmitt, 1420 N. Lake Shore Drive, Chicago, Ill.

Filed Feb. 25, 1959, Ser. No. 795,455

18 Claims. (Cl. 99—238.4)

This invention relates to apparatus for automatically popping and dispensing a predetermined quantity of popcorn by means of high frequency, radiant, electrical energy wherein the cooking and dispensing cycle is desirably initiated manually and terminated automatically.

In particular the invention has reference to an apparatus adapted to be located in commercial establishments, e.g. retail stores, railroad and bus depots and the like wherein coin-operated machines for vending various comestibles are placed for the convenience of the public.

Heretofore popcorn has been made available for self-service in a form prepared at some central source, bagged for transportation and stored for dispensing in a suitable container forming part of a coin-actuated vending machine. The time elapsing between preparation and sale is quite variable and may be appropriately measured in days. Thus the product is not characterized by the freshness, palatability and flavor of popcorn prepared in situ. Moreover, in such prior vending machines the product is being continuously warmed by an incandescent lamp or equivalent source of heat which results in rapid desiccation and further diminution of palatability.

My invention has for its principal object the provision of apparatus wherein a supply of raw popcorn may be stored; therefrom automatically dispensed in a measured quantity to means for heating the same to popping temperature and, following popping, delivered to the vendee in a suitable receptacle for consumption.

Another object is to provide apparatus in accordance with the foregoing in which high frequency, radiant, electrical energy constitutes the cooking medium.

A further object is to provide a popping compartment designed for most expeditious and efficient popping of the raw corn.

Still another object is to provide a popping compartment combined with novel means for transferring the finished product to a delivery chute.

An additional object is to provide an electrical circuit and components therein comprising the source of heating energy in which some of said components are utilized also as mechanically-functioning portions of the apparatus.

Another object is to provide electrical means for effecting a cycle of operation of the apparatus capable of being initiated into operation by the vendee in response to closure of a switch which, within the scope of the invention, may or may not be coin-operated.

An additional object resides in providing, in apparatus of the character outlined above, of means for shielding the high frequency radiation to avoid interference with neighboring apparatus capable of being affected thereby together with the respective entrance and exit apertures for feeding the raw popcorn to the cooking space and for discharging the finished product which apertures are provided with automatically-operating gates for closing the same during such periods of time when power is applied to the high-frequency generator.

Additional objects reside in the provision of apparatus in accordance with the foregoing which is compact, comprises comparatively few mechanical features to minimize the expense of maintenance and repair, and is reliable, non-hazardous and foolproof in operation.

Other objects will become apparent as the description proceeds which latter, taken with the accompanying drawings, discloses a preferred mode of carrying the invention into practice.

In these drawings:

Fig. 5 is a side elevational view showing the means for transferring the finished product to the delivery spout;

Fig. 7 is a schematic diagram of the high-frequency generator.

Figure 1:
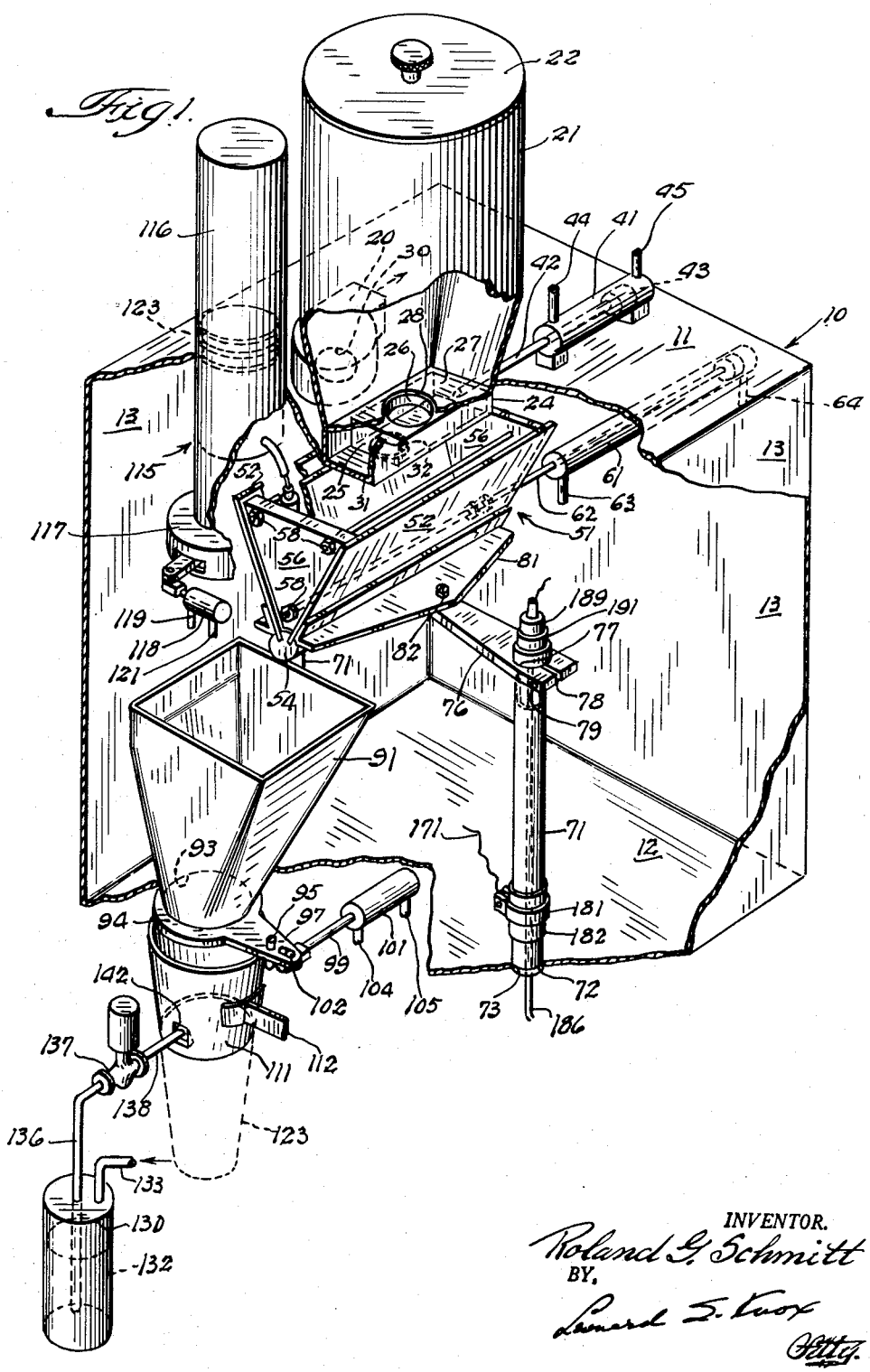
Fig. 1 is a perspective view to illustrate the essential features of the invention.

In several of the figures parts are broken away for clarity.

Broadly regarded, the invention comprises a cabinet to contain and support the various components comprising the invention, a subsidiary compartment whereof is especially constituted to house the means for raising the raw popcorn to popping temperature including a chamber and a generator of high frequency radiant energy having electrodes cooperative with the chamber. Exterior to this compartment is a hopper for storing a quantity of raw popcorn which is provided with a reciprocable measuring gate movable with respect to the exit of the hopper to receive, in one direction of movement, a predetermined charge of raw popcorn and, in the opposite direction of movement, to deliver the charge to the cooking chamber. The gate is so constructed and arranged with respect to an entrance opening to the compartment that, when current is applied to the high frequency generator the opening is closed to complete the necessary electrostatic shield.

The cooking chamber is desirably an elongated trough of transverse V-shaped cross section to define a narrow zone at the bottom thereof whereinto the measured charge of raw popcorn may fall and the sides whereof extend upwardly sufficiently to contain the somewhat expanded volume occupied by the popcorn after it is cooked. A pair of elongated electrodes are positioned adjacent the bottom of the cooking chamber and receive energy from an oscillator circuit, preferably one of the push-pull type. The oscillator includes a pair of coaxial resonant transmission lines as part of the output, the outer conductors of which constitute mechanical supports for the chamber and the electrodes operatively related thereto.

It has been found that moisture driven off from the raw popcorn during popping will deposit on the walls of the cooking chamber and tend to inhibit some of the raw popcorn from falling to a position in the field between the electrodes. To cure this difficulty I provide a continuously-operating blower having its inlet opening into the top wall of the enclosure for the cooking chamber and parts directly appurtenant thereto and exhausting to atmosphere whereby the walls are maintained dry at all times.

The ends of the trough are a pair of V-shaped members slidably congruent with the sides thereof. These members are spaced apart by longitudinally-extending tie rods, one of which is connected to the piston rod of a pneumatic cylinder and piston whereby the co-joined members may, following completion of the cooking operation, be reciprocated to discharge the product into a first delivery chute within the shielding enclosure whereupon the members are restored to their former relation with the cooking chamber for a subsequent batch.

Prior to discharge of the finished product into the first delivery chute a paper cup or other container has been automatically positioned at the exit end of a second delivery chute which, in effect is a continuation of the first, the interruption being provided to permit interposition of an automatically-operated gate serving to seal the exit end of the first delivery chute to complete the electrostatic shield.

The second delivery chute is provided with an adjunct for spraying melted butter or other shortening on the finished product as it is being delivered to the container. If desired a salt-delivering adjunct may be incorporated.

The entire apparatus is arranged for automatic operation. In practice the invention apparatus is intended for vending a measured quantity of popped product in response to deposit of a coin or coins whereupon the apparatus is initiated into operation through a full cycle which is then automatically terminated. Desirably the oscillator employs thermionic triodes in which case the same may be so connected that the filaments or cathode heaters, as the case may be, are maintained continuously "on" in order to avoid the lag inherent in heating the tubes for each cycle. Customary coin-receiving mechanism is employed and is connected to close a switch cooperative with a plurality of cam-operated contacts and circuitry therefor to carry through a cycle of operation. It will be understood from the following description that this switch may be opened and closed in other ways. Operation of the various mechanical components in response to the electric circuitry is desirably through solenoid-operated valves which control a compressed air supply to pneumatic cylinders.

Adverting now to the drawings (Figs. 1 to 5) it will be understood at the outset that the invention apparatus will be housed in a suitable cabinet of the character generally employed for vending comestibles upon the exterior of which is a convenient slot or slots for deposit of coins and a reach-in space for removing the container and the popcorn therein. Since such features are largely conventional they are omitted for convenience and clarity of exposition.

Forming a part of or enclosed within the cabinet is a subsidiary compartment or enclosure 10 including a top wall 11, a bottom wall 12 and four side walls 13, one of which is omitted in Fig. 1 and portions of the remainder broken away better to reveal components within. These several walls are of metal, desirably aluminum, to serve as an electrostatic shield against the radiant energy. One or more of the side walls 13 are made removable for reasons of assembly and servicing. All of the walls are imperforate except as required for fastening expedients, and except for apertures for entrance of the raw popcorn and exit of the finished product respectively, and to which detailed consideration will be given subsequently. The side wall facing the customer may, if desired, be provided with a transparent window so that the customer may be diverted by viewing the popping operation.

Arranged above the wall 11 is a supply hopper 21 to receive a substantial quantity of raw popcorn (not shown), access being had by means of a cover 22. The lower region of the hopper 21 is secured to a box-like housing 24 serving as a guide for reciprocating motion of a gate 25 having a through aperture 26. The top wall 27 of the guide 24 is correspondingly apertured at 28 to register with the aperture 26 when the gate 25 is in loading position, as shown. The diameter of the aperture 26 and its axial dimensions are so selected that, when full of raw popcorn, the same represents a predetermined measure thereof for one order. The lower wall 31 of the guide 24 is apertured at 32 in order that when the gate 25 is in discharging position its contents may be delivered through the aperture 32. It will be apparent that, in the position of the parts shown, the aperture 26 is in loading relation with the hopper 21 through the aperture 28 and the aperture 32 is obturated, and vice versa. If desired the lower wall 31 of the guide 24 may simply be a portion of the top wall 11 of the compartment 10. Reciprocation of the gate 25 is effected by any suitable actuator, e.g. a pneumatic cylinder 41 secured to the wall 11 including a piston rod 42 and piston 43. Connection ports for admitted and exhausted air are represented at 44 and 45. The rod 42 is attached to one end of the gate 25. Thus, by admitting and exhausting air to or from the ports 44 and 45 the gate is actuated as required. The means for performing this function in accordance with the established cycle will be detailed hereinafter.

Positioned below the aperture 32 and within the compartment 10 is the cooking chamber indicated generally at 51. This structure comprises a pair of lateral walls 52 of some material readily permeable to high frequency radiant energy, e.g. Pyrex glass, disposed in convergent fashion to define a V-shaped trough. Although the trough may be comprised of a single sheet of material bent at the apex representing the bottom thereof it is convenient to use sheet stock cut into rectangles and assembled in the desired relation by insertion thereof in longitudinal grooves cut into a backbone 54 of equivalent material. Cement may be used to integrate the three parts. By utilizing a trough of V-shaped transverse cross section the comparatively small volume of raw product constituting the vended batch may be distributed in an optimum manner for heating by the electrodes, i.e. disposed as an elongated mass of relatively narrow cross section.

To strip the cooked product from the chamber 51 the same is provided with a pair of spaced-apart, translationally movable, end walls 56. These, also, are of non-conductive material, e.g. the same as the walls 52 and fit closely, but slidably against the walls 52. A plurality of tie rods 58 span the space between the walls 56 and, by the use of nuts and washers, the same are rendered jointly movable.

A pneumatic cylinder 61 is suitably affixed to the compartment wall 11 and the free end of the piston rod 62 is secured to the end wall 56 confronting the same. If desired the rod 62 may be a continuation of the lower tie rod 58. Ports 63 and 64 afford inlet and outlet for compressed air whereby the assembly of the end walls 56 and the tie rods 58 appurtenant thereto may be reciprocated to discharge the popped product and then retracted to confine the succeeding charge.

The outer conductors of the coaxial, resonant, transmission line elements of the oscillator are conveniently utilized as mechanical supports for the cooking chamber thereby dispensing with the need for separate metallic supports which would otherwise absorb radiant energy and thus diminish the efficiency of the oscillator.

To this end I provide a pair of metallic tubes 71 disposed on opposite sides of the walls 52 and secured in the bottom wall 12 of the shielding enclosure 10 by shouldering the lower end of the tubes as at 72, passing the same through apertures 73 and swaging the ends to rigidify the same. At the upper end the tubes 71 each carry an electrically-conductive support 76 (only one of which is visible in Fig. 1) which is apertured at 77, split at 78 and clamped by a screw 79. At the distal end of each arm 76 there is secured, by means of a screw or bolt 82, an elongated electrode 81. These electrodes are identical and have a transverse cross section substantially of L-shape as shown, to complement the slope of the walls 52 to which they are affixed by a suitable adhesive or other means. At this juncture it will have become apparent that an electrostatic field established between the electrodes will raise the raw corn to popping temperature.

The remainder of the oscillator and its mode of operation will be expanded upon subsequently.

The cooked product is discharged from the chamber 51 into a first, funnel-shaped delivery chute 91 positioned below and adjacent the forward end of the chamber (as seen in Fig. 1), the same being attached to the bottom wall 12 by suitable brackets 92 (Fig. 2) and the exit end of which being in register with an opening 93 in the wall 12. Below the opening 93 and contiguous to the wall 12 is a shutter or gate 94 pivoted to the wall 12 at 95 and provided with a radial arm 97, to the distal end of which the piston rod 99 of a pneumatic cylinder 101 is articulated by suitable pin-and-slot means 102. Ports 104 and 105 provide inlet and outlet means for the cylinder 101. At suitable points in the cycle the cylinder 101 is actuated to move the shutter 94 into "open" and "closed" positions with respect to the opening 93, as will appear.

Below the aperture 93 there is positioned a second delivery chute 111 carried with respect to the cabinet framework by a bracket 112. As is apparent, when the shutter 94 is open the cooked product discharged into the first chute 91 will pass into the second chute 111.

Figure 2:
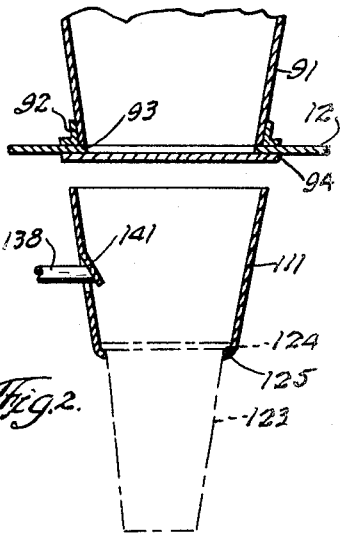
Fig. 2 is a detail showing the arrangement for passing the popped corn from the shielded cooking chamber to the exterior thereof.
Figure 3:
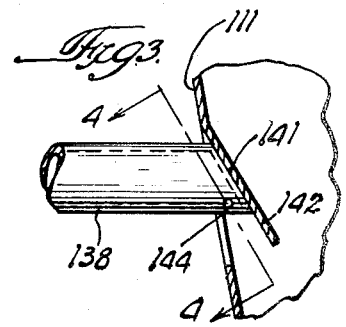
Fig. 3 is a somewhat enlarged detail of a portion of Fig. 2 showing the means for delivering melted butter or other shortening to the finished product.
Figure 4:
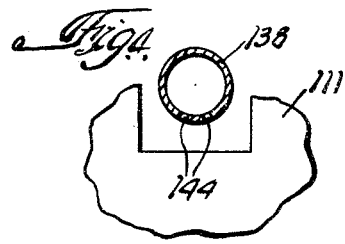
Fig. 4 is a cross section taken on the line 4—4 of Fig. 3.

A dispenser for paper cups or other suitable receptacle is shown generally at 115 and may be of any well-known form, including a storage tube 116 and a feeder 117 actuated by a pneumatic cylinder 118 having ports 119 and 121. Inasmuch as the cup dispenser per se forms no part of the invention the same will not be detailed further except to say that the axis thereof is positioned within the projected area of the top of the first chute 91 whereinto a cup 123 fed by the dispenser 115 may be dropped for descent to the lower margin of the second chute 111 (Fig. 2). The cup 123 has the usual peripheral bead 124 engageable with the slightly inturned rim 125 of the chute 111 whereupon it is retained while being filled but wherefrom it may be dislodged by the customer. A suitable mechanism 117 is disclosed in U. S. Letters Patent No. 2,268,421.

For supplying melted butter or other fluid shortening to the finished product, I provide a closed receptacle 131 to contain a reasonable quantity of the shortening 132. An inlet pipe 133 opens into the air space above the shortening 132 whereby compressed air constantly fed thereto creates a pressure head. A discharge or feed conduit 136 has an open end adjacent the bottom of the receptacle 131 in order that the shortening may be forced thereinto. A solenoid valve 137 is interposed between the conduit 136 and its continuation 138. The valve is operated in a manner to be detailed.

The terminal end of the tube 138 (Figs. 3 and 4) is closed by a cap 141 which is located adjacent a deflector vane 142 struck out of the chute 111, and is provided with a plurality of aperatures 144 wherefrom the shortening is sprayed under pressure when the valve 137 is open. It will be apparent from Fig. 2 that the direction of the spray, the position of the apertures 144 and the timing are such as to direct the shortening upon the finished product during the time it is filling the receptacle 123.

The oscillator for generating the high frequency radiant energy may be of any suitable form although I prefer to employ a push-pull arrangement feeding to tunable devices for maximum power output and stability, e.g. a pair of resonant, coaxial transmission lines. Thus, turning to Fig. 7, I show a source of alternating current supply, e.g. 110 volts, 60 cycles feeding the primary 151 of a transformer 152, the secondary 153 of which is center-tapped at 154 and grounded. Grounded capacitors 157 shunted across terminal 154 and the leads 158 from the secondary 153 bypass radio frequency around the secondary to minimize heating of the transformer core.

A pair of thermionic triodes 161 or equivalent devices have their cathodes 162 fed alternately from the halves of the secondary 153 for push-pull operation. The grids 164 receive excitation through the respective alternate output circuits via conductors 171 and coupling capacitors 172 connected to the outer conductors 71 of a pair of resonant, coaxial transmission lines referred to in connection with Fig. 1. The tubes 71 represent the high frequency output of the oscillator which is fed through the supports 76 to the electrodes 81.

Tubes 71, constituting a part of a resonant transmission line, have, in the present case, an effective length of one quarter of the wave length. For purposes of the invention the oscillator frequency desirably approximates 85 mc.

Each of the capacitors 172 is mechanically constituted by providing a metallic clamp 181 around a dielectric sleeve 182, e.g. Teflon, the plates being respectively the tube 71 and clamp 181.

The triode plates 185 feed the respective transmission lines through conductors 186 which are coaxial with the tubes 71 and are seen in Fig. 1 as rods or stiff wires to which flexible leads are secured in a conventional manner. Coupling of the plates 185 to the tubes 71 is by means of capacitors 187 constituted mechanically by metallic plugs 189 separated from the tubes 71 by dielectric sleeves 191. These capacitors block D.C. from the resonant line. The ground connections 192 are represented mechanically by the swaging of the lower terminus 72 of the tubes 71 in the wall 12 as heretofore described.

Plate supply (B+) is shown at 195. Oscillatory current is kept out of the B+ supply by means of grounded capacitors 196. The choke coils isolate the high frequency output from the low impedance B+ supply. Grid bias is provided by resistors 198.

As mentioned heretofore, the invention apparatus is ideally adapted to coin-operated vending. Accordingly, preferred means for accomplishing an automatic cycle of operation in response to deposit by the vendee of the prescribed coin or coins will be described by reference to a switch responsive to deposit of the coins and reference to the coin receiver per se will be omitted since such devices are well-known. Essentially deposit of the proper coin or coins will close a switch to initiate a cycle of operation whereupon the same is automatically terminated pending a subsequent sale. It will also be understood that the invention, in all its essential features, may be cyclically operated continuously for producing larger batches of the finished product or manually operated by a noncoin-operated starting switch.

Figure 6:
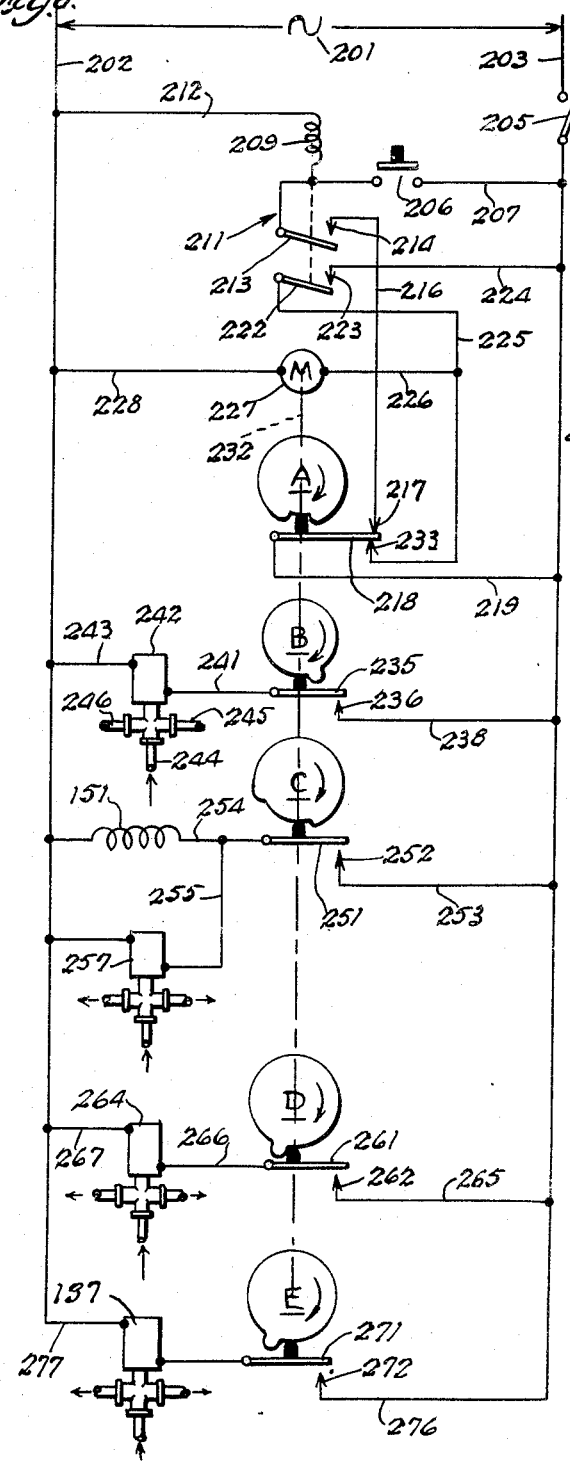
Fig. 6 is a schematic diagram showing the control circuitry and mechanical features cooperative therewith.

Accordingly, and referring to Figs. 1 and 6, I have shown a source of current supply 201, preferably 110 volts at 60 cycles, feeding buses 202 and 203. The usual main line switch is shown at 205. The switch for initiating a cycle of operation is shown at 206 and is of the momentary make-and-break type inserted in a lead 207 connected to bus 203. The operating coil 209 of a relay 211 is placed in series with the switch 206 via a conductor 212 to bus 202.

One of the two armatures, namely, 213, of the relay 211, together with its back contact 214 is part of a holding circuit for the relay which is picked up on momentary actuation of the switch 206 and holds the relay "in" pending release thereof. The holding circuit may be traced from one end of the coil 209, through armature 213 and contact 214, over a lead 216 to back contact 219 of a switch tongue 218, through the tongue and a lead 219 to bus 203 whereby the relay is locked in until the circuit is broken by actuation of the tongue 218.

The other armature 222, through its back contact 223 closes a circuit which may be traced as follows: from bus 203, over lead 224, contact 223, armature 222, leads 225 and 226, motor 227, lead 228 to bus 202 whereby operation of the relay will start the motor.

Motor 227 is provided with a shaft 231 to which is keyed the plurality of timing cams A to E inclusive, rotation being indicated as clockwise. As soon as the motor has been started the circuit therefor is transferred from that previously established through the armature 222 and its contact 223 to one through the tongue 218 and its front contact 233 thereby restoring the relay for a subsequent cycle. Thus the cam A is rotated by the motor 227 through a few degrees until the rise thereof actuates the tongue 218 against the contact 233 thereby interrupting the holding circuit for the relay and permitting it to drop out. Concurrently the motor circuit is re-established from bus 203, over lead 219, tongue 218, contact 233, leads 225 and 226, through the motor 227 and lead 228 to bus 202.

Following the foregoing motor-switching function the cam B operates its tongue to close a circuit from bus 203, over branch 238, through back contact 236, tongue 235, lead 241, solenoid valve 242 and branch 243 to bus 202. Thus compressed air supplied to the valve through a conduit 244 is alternately fed to the ports 245 and 246 which are connected in parallel to the ports 44 and 45 of the cylinder 41 and the ports 119 and 121 of the cylinder 118.

It will be understood in connection with valve 242 and other similarly functioning valves to be described that the ports, e.g. 245 and 246, alternate between admission and exhaust depending upon the direction of strokes of the associated piston. Inasmuch as such function is well understood elaboration is regarded as superfluous.

At the time the valve 242 is actuated as just described the shutter 94 has been in open position as a result of a previous operation shortly to be alluded to. Consequently admission of air to one of the ports 119 or 121, say the port 119, will reciprocate the cup dispensing mechanism 117 to drop one cup 123 into the first chute 91 from whence it passes through the opening 93 and into the second chute 111, upon the rim 125 of which it will rest (Fig. 2). Simultaneously the piston rod 42 is actuated by admission of air to the port 45 to shift the opening 26 of the gate 25 from correspondence with the opening 28 into registry with the opening 32 whereupon the measured charge contained in the opening 26 is deposited at the bottom of the cooking chamber 51. Following actuation of the valve 242 in the manner just described and upon opening of the switch 235—236 the valve restores to normal by reason of the bias spring incorporated therewith which will reverse the pistons of the cylinders 41 and 118 in readiness for a succeeding cycle.

A few degrees after actuation of the switch 235—236 the cam C operates its tongue 251 against contact 252 to complete a circuit from bus 203, over branch 253, over leads 254 and 255 through transformer primary 151 and solenoid valve 257 respectively to bus 202. Thus line voltage is applied to the oscillator (Fig. 7) to establish an electrostatic field across the electrodes 81 and through the raw product which is thereupon subjected to the suitable temperature for a time sufficient to produce the finished popcorn. At the moment the oscillator is turned on the solenoid valve 257 controlling the cylinder 101 is actuated to close the shutter 94. It will have become apparent that by virtue of return of the gate 25 and shutter 94 to the positions illustrated the compartment 10 presents an uninterrupted electrostatic shield to the transmission lines comprising the tubes 71, electrodes 81 and the components sharing their function. Inasmuch as the control exercised by the solenoid valve 257 and those to be referred to hereinafter on their respective cylinders will be obvious from the explanation presented with reference to solenoid 242 further elucidation is deemed unnecessary.

After a lapse of time which has been predetermined empirically for complete popping of the measured charge of popcorn the cam D is effective to close its tongue 261 on the contact 262 to place the solenoid valve 264 across the buses 202 and 203 via conductors 265, 266 and 267. Valve 264 controls the cylinder 61, which is actuated through admission of air to the port 64 to shift the stripper comprised of the end walls 56 and tie rods 58 to the left (Fig. 5) whereby the finished popcorn is directed through the chutes 91 and 111 and into the cup 123. It will be understood that, just prior to the stripping operation the circuit through the tongue 251 and contact 252 has been opened by its cam C, the oscillator has been deenergized and the shutter 94 opened.

The cam E is designed to close the tongue 271 against its contact 272 practically simultaneously with discharge of the popped product into the chutes 91 and 111. Thus the solenoid valve 137 which is in series with the tongue 271 and contact 272 by means of branches 276 and 277 is energized to discharge melted shortening from the apertures 144 (Fig. 3) upon the popcorn as it is delivered to the cup 123. Timing of the cam E is so arranged that spraying of the shortening upon the finished product is substantially concurrent with delivery of the same to the container in order to obtain relatively uniform distribution of the shortening over the whole contents of the cup.

Inasmuch as considerable moisture is driven off from the raw product as the cooking thereof proceeds, the same will precipitate largely on the walls 52 of the cooking chamber. Since it is essential that the kernels of popcorn must fall into a position between the electrodes 81, means are provided for evaporating the moisture continuously in the form of a blower 20 having its inlet 30 opening into the top wall of the enclosure 10 and exhausting to atmosphere.

While I have shown a particular embodiment of my invention, it will be understood, of course, that I do not wish to be limited thereto since many modifications may be made and I therefore contemplate by the appended claims to cover any such modifications as fall within the true spirit and scope of my invention.

I claim:

1. Apparatus for cooking popcorn comprising a chamber having a pair of convergent opposed side walls of electrically non-conductive material pervious to electrical radiant energy inclined to a vertical plane to define a wedge-shaped space at the bottom and a pair of opposed end walls, said chamber having an open top for deposit of a charge of raw popcorn into the said space, a pair of spaced electrically-conductive electrodes one disposed on each side wall opposite said space, and a high-frequency generator of radiant energy, the output of said generator being connected to said electrodes.

2. Apparatus in accordance with claim 1 wherein said electrodes are substantially coextensive longitudinally with the length of said space.

3. Apparatus in accordance with claim 1 further characterized by means for discharging the cooked product from the chamber.

4. Apparatus in accordance with claim 1 wherein at least a portion of said end walls coextensive with the mass of cooked product are provided with means for actuating the same jointly in the longitudinal direction of said space for stripping the cooked product from the chamber.

5. Apparatus in accordance with claim 4 wherein said actuating means comprises a rigid member joining said end walls and a reciprocable mechanism having an operative connection with at least one of said end walls.

6. Apparatus in accordance with claim 1 further characterized by an enclosure constituting an electrostatic shield surrounding said chamber and oscillator, a hopper for a supply of raw product exterior to said enclosure, means providing communication between said hopper and chamber including an aperture through said enclosure for delivering a measured charge of the product to said space, and a movable, electrically-conducting gate co-operative with said aperture selectively shiftable to open said aperture while transferring the raw product to the chamber and to close said aperture when the oscillator is providing energy.

7. Apparatus in accordance with claim 6 further characterized by automatically-functioning means for interlocking opening and closing movements of the gate with "off" and "on" conditions of the oscillator respectively.

8. Apparatus in accordance with claim 6 wherein said gate is provided with a space for receiving and measuring a predetermined charge of raw product from said hopper.

9. Apparatus in accordance with claim 8 wherein said space is a through aperture in said gate, the aperture being adapted for movement between one position in register with the exit of the hopper for reception of the charge and another position in register with said enclosure aperture.

10. Apparatus in accordance with claim 3 further characterized by chute means having an entrance end into which the cooked product may be discharged and an exit end including means for temporarily holding a container for reception of the product.

11. Apparatus in accordance with claim 3 further characterized by an enclosure surrounding the oscillator and electrodes for electrostatic shielding of the same, said enclosure including a wall portion, a chute having an entrance end into which the cooked product may be discharged and an exit end terminating at said wall portion, said wall portion having an aperture at least coextensive with said exit end, a shutter adapted to close and open said aperture, and automatically-operating means for actuating said shutter to close and open said aperture when said oscillator is "on" and "off" respectively.

12. Apparatus in accordance with claim 11 further characterized by a second chute positioned below said enclosure aperture for receiving the cooked product delivered to said first chute when said shutter is in open position, the exit end of said second chute being adapted to temporarily retain a container into which the cooked product is delivered.

13. Apparatus in accordance with claim 10 further characterized by means for spraying liquid shortening on the cooked product as it is delivered to the container.

14. Apparatus in accordance with claim 13 wherein said spraying means comprises a tube having a perforate end portion, a storage receptacle for the shortening, said end portion extending into said chute for directing the spray upon the cooked product delivered therethrough, and pressuring means for forcing the shortening through the tube.

15. Apparatus in accordance with claim 14 further characterized in that said chute is provided with a side opening to receive said tube and a downwardly and inwardly directed vane overlying said perforate tube end portion for deflecting the descending cooked product away from said tube.

16. Apparatus for cooking popcorn by subjecting the same to the energy contained in a high-frequency electrostatic field comprising a chamber for receiving a mass of raw popcorn, said chamber including a pair of opposed walls which are pervious to the energy, a pair of electrodes disposed contiguous to said walls and on either side of said mass, a push-pull circuit and components therein for providing high frequency, oscillating, radiant energy, the output of said circuit including a pair of coaxial, resonant, transmission lines, the outer conductor of each line comprising a rigid tube, a base for mounting said tubes in spaced apart relation, and means for rigidly securing said electrodes to said tubes respectively.

17. Apparatus in accordance with claim 16 wherein said chamber walls are secured to said electrodes for support of said chamber on said tubes.

18. Apparatus in accordance with claim 16 wherein said opposed chamber walls are mutually convergent to define a V-shaped space having an apical region for reception of the raw popcorn and said electrodes are each provided with a face parallel to the sides of said space.

References Cited in the file of this patent

UNITED STATES PATENTS

| Number | Name | Date |
|---|---|---|
| 1,621,113 | Hill | Mar. 15, 1927 |
| 1,972,050 | Davis | Aug. 28, 1934 |
| 1,976,142 | Roach | Oct. 9, 1934 |
| 2,324,046 | Doren et al. | July 13, 1943 |
| 2,355,887 | Monile | Aug. 15, 1944 |
| 2,489,135 | Himmel et al. | Nov. 22, 1949 |
| 2,498,632 | Anderson et al. | Feb. 28, 1950 |
| 2,590,580 | Schiavone | Mar. 25, 1952 |
| 2,602,134 | Nelson | July 1, 1952 |